United States Patent
Hu et al.

(10) Patent No.: US 8,179,853 B2
(45) Date of Patent: May 15, 2012

(54) METHOD OF SCHEDULING DATA TRANSMISSION IN A RADIO NETWORK

(75) Inventors: Rong Hu, Beijing (CN); Jinhua Liu, Beijing (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 501 days.

(21) Appl. No.: 12/445,631

(22) PCT Filed: Dec. 13, 2006

(86) PCT No.: PCT/SE2006/050577
§ 371 (c)(1),
(2), (4) Date: Apr. 15, 2009

(87) PCT Pub. No.: WO2008/073013
PCT Pub. Date: Jun. 19, 2008

(65) Prior Publication Data
US 2010/0189080 A1 Jul. 29, 2010

(51) Int. Cl.
*H04L 12/56* (2006.01)
*H04L 12/28* (2006.01)
*H04W 4/00* (2009.01)

(52) U.S. Cl. .............. 370/329; 370/335; 370/395.4; 455/450; 455/453

(58) Field of Classification Search .......... 370/230, 370/329, 335, 395.4, 455–462; 455/403–512, 455/445–453; 375/267, E1.003; 715/751–963
See application file for complete search history.

(56) References Cited

U.S. PATENT DOCUMENTS

| 6,084,855 A | 7/2000 | Soirinsuo et al. |
| 2002/0183066 A1* | 12/2002 | Pankaj .......................... 455/453 |
| 2003/0012220 A1 | 1/2003 | Kim et al. |
| 2005/0043031 A1 | 2/2005 | Cho et al. |
| 2007/0060148 A1* | 3/2007 | Manuel ........................ 455/445 |
| 2007/0300163 A1* | 12/2007 | Alford et al. ................... 715/751 |

FOREIGN PATENT DOCUMENTS

| EP | 1 549 004 | 6/2005 |
| WO | WO 0245362 | 6/2002 |
| WO | WO 03017572 | 2/2003 |

OTHER PUBLICATIONS

Written Opinion of the International Searching Authority for PCT/SE2006/050577, mailed Sep. 5, 2007.

* cited by examiner

*Primary Examiner* — Afsar M. Qureshi
(74) *Attorney, Agent, or Firm* — Nixon & Vanderhye P.C.

(57) ABSTRACT

In a method and apparatus for scheduling users in radio network system, the scheduling priority for each user of a group of users is made dependent on the unusable time for each user. Scheduling of the users is performed in accordance with the determined scheduling priority.

14 Claims, 4 Drawing Sheets

METHOD OF SCHEDULING DATA TRANSMISSION IN A RADIO NETWORK

This application is the U.S. national phase of International Application No. PCT/SE2006/050577, filed 13 Dec. 2006, which designated the U.S., the entire contents of which is hereby incorporated by reference.

TECHNICAL FIELD

The technology described herein relates to a method and a device for scheduling data transmission in a radio network.

BACKGROUND

Today a number of different technologies for cellular telecommunication exist. One such existing cellular telecommunication technology is Wideband Code Division Multiple Access (WCDMA).

In a WCDMA system, which is a powerful standard able to transmit data over a radio network at very high speed, a User Equipment (UE) such as a mobile telephone communicates over radio channels with base stations typically denoted Node B. The omni-area around a base station can be allocated into several sectors known as cells. The base station transmits and receives signals over selected radio channels in each cell. Typically, a base station is connected to one or more radio network controller nodes (RNC). One or more RNCs are, in turn, connected to the core network (CN). The CN is usually connected. e.g., via a gateway to other telecommunication networks, such as the public switched telephone network or to a packet-data network such as the internet.

In a wideband code division multiple access (WCDMA) mobile telecommunications system, the information transmitted between a base station and a particular UE is modulated by mathematical codes (such as spreading codes) to differentiate the information for different services of this UE and the information for different UEs which are utilizing the same radio frequency. Thus, in WCDMA the data signal over each mobile radio employs its own unique code sequence to encode its signal. The receiver, knowing the code sequences of the mobile radio it services, decodes the received signal to recover data from each radio.

In the standard 3GPP Release. 5, High-Speed Downlink Packet Access (IISDPA) is introduced for WCDMA. MSDPA achieves the increase in the data transfer speeds by defining a new WCDMA channel: a high-speed downlink shared channel (HS-DSCl-1) that operates in a different way from existing DPCH channels and is used for downlink communications to the mobile.

Along with the 1-1s-DSCI 1 channel, three new physical channels are also introduced. One is the High Speed-Shared Control CHannel (HS-SCCH) which informs the user that data will be sent on the HS-DSCH 2 slots later. The second one is the uplink High Speed-Dedicated Physical Control CHannel (HS-DPCCH), which carries acknowledgement information and current channel quality indicator (CQI) of the user. This value is then used by the Node-B in scheduling, including scheduling user and calculating how much data to send to the scheduled UEs. The third downlink physical channel is the High Speed-Physical Dedicated Shared CHannel (HS-PDSCH), which carries the information transferred by HS-DSCH.

Furthermore, TTI, Transmission Time Interval, is a parameter in WCDMA and other digital telecommunication networks related to encapsulation of data from higher layers into frames for transmission on the radio link layer. TTI refers to the length of an independently decodable transmission on the radio link. The TTI is related to the size of the data blocks passed from the higher network layers to the radio link layer.

To combat errors due to fading and interference on the radio link the data in the transmitter buffer is divided into blocks and then the bits within a block are encoded and interleaved. The length of time required to transmit one such block determines the TTI. At the receiver side all bits of a given block must be received before they can be deinterleaved and decoded.

In order to be able to adapt quickly to the changing conditions in the radio link a communications system must have shorter TTIs. In order to benefit more from the effect of interleaving and to increase the efficiency of error-correction and compression techniques a system must, in general, have longer TTIs. These two contradicting requirements determine the choice of the TTI.

In 3GPP Release '99 the shortest TTI is 10 ms and can be 20 ms, 40 ms, or 80 ms. In 3GPP Release-5 the TTI for HSDPA is reduced to 2 ms. This provides the advantage of faster response to link conditions and allows the system to quickly schedule transmissions to mobiles which temporarily enjoy better than usual link conditions.

In FIG. 1, the timing of HSDPA transmission in the air interface is depicted. The control information for a UE is sent over the HS-SCCH 2 slots prior to the corresponding data transmission over the HS-DSCH in order to ensure that the UE has enough time to receive and decode the necessary information. Based on this information the UE determines if and how to receive the subsequent HS-DSCH data. If the UE determines that there is an HS-DSCH carrying data for that particular UE, the CE receives the HS-DSCH data and starts to process the received data as soon as the HS-DSCH receiving ends.

The UE takes about 7.5 slots to process the received HS-DSCH. Then the acknowledgement information for the HS-DSCH is sent over the first slot of HS-DPCCH. The duration from the HS-SCCH transmission start to the HS-DPCCH transmission end is about 15.5 slots and can not be interrupted, otherwise the data could be regarded as being lost.

In order to perform Inter Frequency Handover (IFHO) and Inter Radio Access Technology Handover (IRAT HO), Compressed Mode (CPM) for HSDPA is to be implemented. FIG. 2 shows the timing of the CPM timing in the air interface. The CPM is defined in "3GPP TS 25.215 V6.4.0, Technical Specification Group Radio Access Network; Physical layer—Measurements (FDD)". The following abbreviations will be used: TG: Transmission Gap. TGPL: Transmission Gap Pattern Length in number of frames. TGCFN: Transmission Gap Connection Frame Number, which is the Connection Frame Number (CFN) of the first radio frame of the first pattern within the TG-Pattern sequence. TGSN: Transmission Gap Starting Slot Number, which indicates the time offset from the TGPL start to the transmission gap start. TGL: Transmission Gap Length in number of slots. TGD: Transmission Gap start Distance in number slots, which is the duration between the starting slots of two consecutive transmission gaps within one transmission gap pattern.

Furthermore, there are different TG-Patterns for different measurement targets. Here are some examples:

The current default TG-Pattern for IFHO:
TGPL=4, TGL=7, TGSN=4, TGD=0, TGCFN=0

The current default TG-Patterns for IRAT HO:
TGPL=8, TGL=7, TGSN=4, TGD=0, TGCFN=0
TGPL=8, TGL=7, TGSN=4, TGD=0, TGCFN=2
TGPL=8, TGL=7, TGSN=4. TGD=0, TGCFN=6

There are also some proposed TG-Patterns namely:
TGPL=4, TGL=14, TGSN=8, TGD=0, TGCFN=0
TGPL=8, TGL=14, TGSN=8, TGD=0, TGCFN=0
TGPL=24, TGL=14, TGSN=8, TGD=0, TGCFN=4
TGPL=24, TGL=14, TGSN=8, TGD=0, TGCFN=13
TGPL=24, TGL=14, TGSN=8, TGD=0, TGCFN=20

During the TG, the UE is performing measurements in another frequency in the original network or another network with different radio access technology (RAT). Hence, the UE can not transmit signal to or receive the signal from the original serving cell during this time.

The impact of the CPM on HSDPA users will now be described. As the process from the HS-SCCM transmission start to the corresponding HS-DPCCH transmission end can not be interrupted, scheduling a user in CPM should be avoided during a gap described above and the 15.5 slots before the gap. For a 7-slot or 14-slot gap, the number of the usable slots is then about 22.5 or 29.5 slots. The UE may work in multiple TG-Patterns. Also, depending on the TGD setting, there are possibly several gaps within one pattern.

Furthermore, the UE can be in CPM for several seconds or even longer, during which the UE suffers a longer packet delay than before the UE entered CPM.

Another factor that has to be considered is that the UE in CPM usually suffers very bad channel quality. For some schedulers such as proportional fair or maximum channel quality indicator (CQI), which considers the channel quality, the scheduling delay for the UEs in CPM is very large even if the impact of the gap is not taken into account.

Hence, the UEs in CPM experience a very large packet delay compared to those UEs not in the CPM due to both the bad channel quality and the transmission gap. The UEs in CPM also have a high risk of experiencing a high packet loss because of the retransmission failure resulted from T1 timer expires and the maximum scheduling delay reached if there is a maximum delay threshold setting in the scheduler such as the High Speed Medium Access protocol (MAC-hs) delay scheduler.

SUMMARY

The technology described herein seeks to improve the performance in a radio system having users operating in different modes within the same radio network.

The technology described herein further seeks to overcome or at least reduce some of the problems associated with schedulers, in particular schedulers for use in radio networks supporting CPM.

These non-limiting aspects of the technology described herein are obtained by providing a scheduler operative to take the unusable time for each user in group of users into account in the scheduler to increase the satisfaction rate of these users.

Thus, in the case when the radio system supports CPM, by increasing the scheduling priority of the UE in CPM according to $T_{unusable}$ during $TP_{pre}$ the probability of the UE to be scheduled before the start of $T_{unusable}$ is increased. This will turn result in that a UE in CPM will have an increased probability to send out the packets that is already queued for a long time and process the retransmissions before the start of $T_{unusable}$. Thus, the packet delay and the packet loss rate of the UEs in CPM is decreased.

Thus, by increasing the scheduling probability of the users in CPM before the unusable TTIs occurs, the impact from these unusable TTIs on the packet delay and the packet loss rate of these UEs can be reduced. For the UEs with delay sensitive services over HSDPA, such packet delay reduction can increase their probability to be satisfied.

The inclusion of the unusable time for each user as a parameter when determining the scheduling priority will hence increase performance for the overall system for CPM supporting systems as well as other systems with the same or similar properties.

BRIEF DESCRIPTION OF THE DRAWINGS

The technology described herein is described in more detail by way of non-limiting examples and with reference to the accompanying drawings, in which.

DETAILED DESCRIPTION

Figure 1:
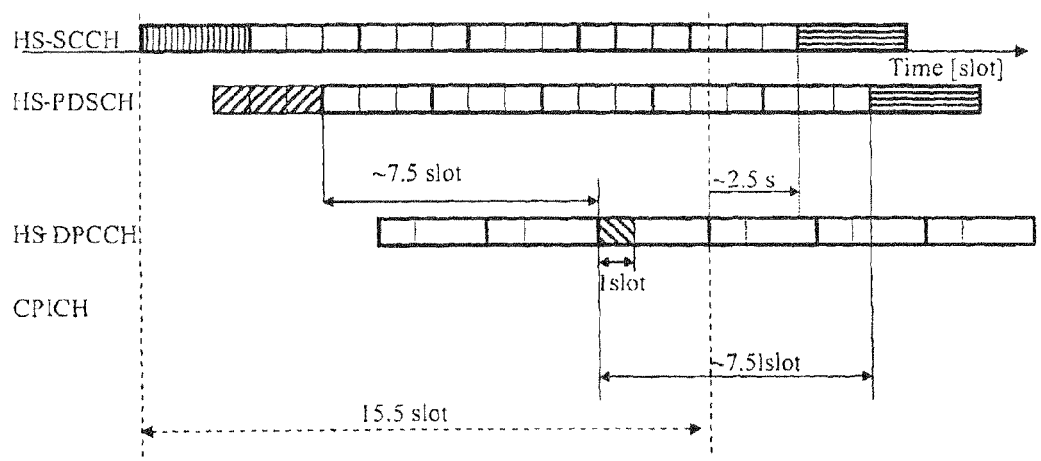
FIG. 1 is a view of the timing of NSDPA transmission in the air interface
Figure 2:
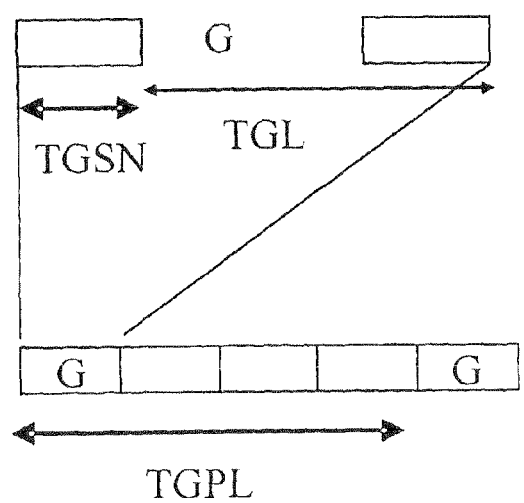
FIG. 2 is a view of the timing of the CPM timing in the air interface
Figure 3:
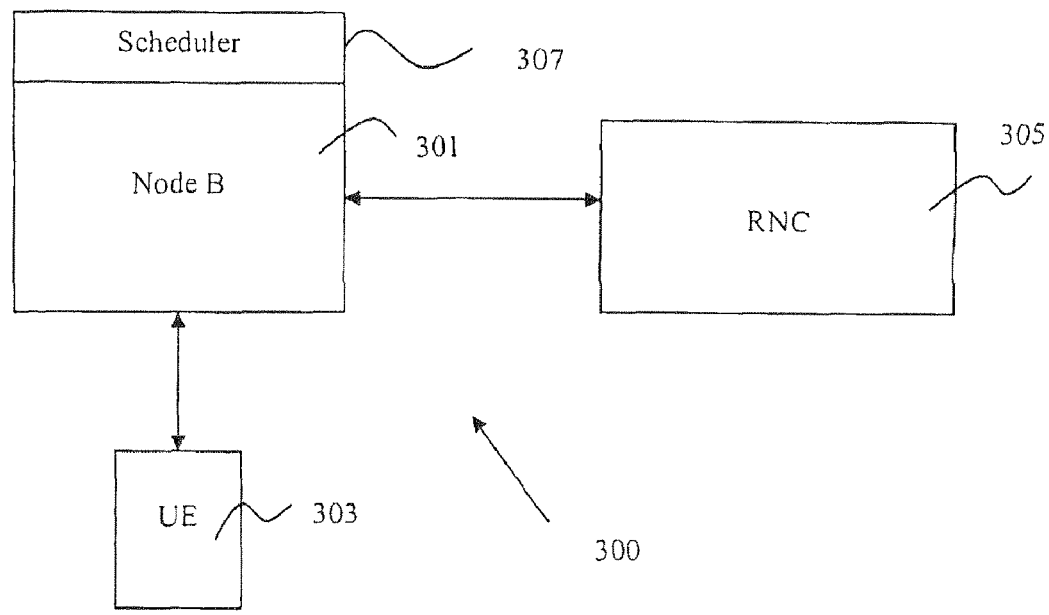
FIG. 3 is a general view of a WCDMA system supporting HSPDA and CPM

FIG. 3 is a general view of a WCDMA system 300 supporting HSPDA and CPM. The system 300 comprises a base station (Node B) 301. The base station 301 serves a number of mobile terminals, usually termed User Equipment (UE) 303, located within the area covered by the base station 301. The base station 101 is also connected to a radio network controller node (RNC) 305. The system 300 also comprises a scheduler 307 co-located with or an integral part of the base station 301. Some aspects of the scheduler 307 will be described more in detail below.

In order to reduce the negative impact of CPM for the UEs the system 300 is configured to consider the impact of the unusable TTIs resulting from the gap ill a certain period of time before the start of these unusable TTIs in the scheduling, for example the MAC-hs scheduling.

Figure 4:
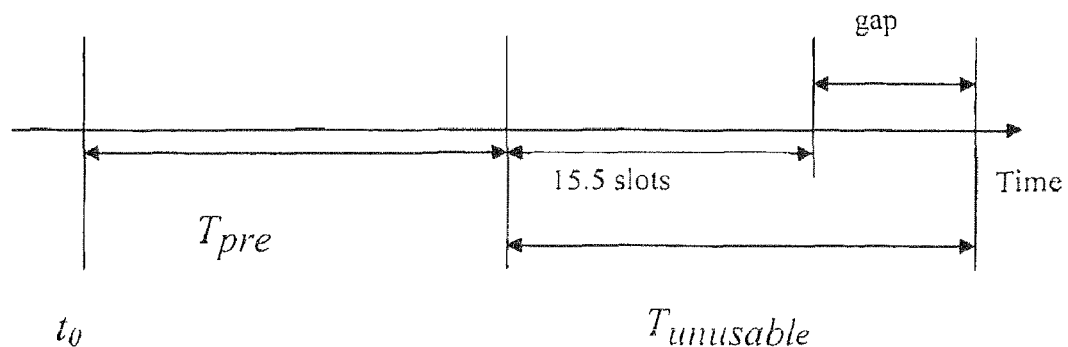
FIG. 4 is a view illustrating timing in a scheduler adapted to consider unusable TTIs

FIG. 4 illustrates a non-limiting example when the scheduler considers the unusable TTIs in order to reduce the packet delay and packet loss rate for UEs in CPM. In FIG. 4 $T_{unusable}$ denotes is the number of tile unusable slots resulted from one gap. Further, $T_{pre}$ denotes the period of time that should consider $T_{unusable}$ before the start of $T_{unusable}$, and $t_0$ is the start of $T_{pre}$. By increasing the scheduling priority of the UE in CPM according to $T_{unusable}$ during $T_{pre}$, the probability of the UE to be scheduled before the start of $T_{unusable}$ is increased, which results in that a UE in CPM will have an increased probability to send out the packets that is already queued since long and process the retransmissions before the start of $T_{unusable}$. As a result, the packet delay and the packet loss rate of the UEs in CPM is decreased.

Below different non-limiting examples on how to implement such an approach in different schedulers are described more closely:

Example 1

Implementation in a Delay Scheduler

Prior to each gap, during $T_{pre}$, the coming unusable TTIs as is used as the delay:

$$f(\text{maximum\_delay}) = 1/(T_{max} - (t_{queue} + T_{unusable}))$$

where $t_{queue}$ is the time corresponding to the time the packet has already been queued, $T_{MAX}$ is the maximum allowable queuing delay and $T_{pre}$ is determined by the scheduler and the delay requirements of different services.

Example 2

Implementation in a Proportional Fair Scheduler

Prior to each gap, during $T_{pre}$ take the coming unusable TTIs as the used time:

$$f(\text{average\_rate}) = \left(\frac{N_b}{t_{used} + T_{unusable}}\right)^{-1}$$

where $t_{used}$ is a certain period before the scheduling priority calculation, $N_b$ is the number of transmitted bits during the $t_{used}$ and $T_{pre}$ determined by the scheduler and the delay requirements of different services.

Example 3

Adding a New Priority Coefficient in Existing Schedulers

In addition to all the existing priority coefficients, during $T_{pre}$, a new priority coefficient, a pattern coefficient, is added for the users in CPM:

$$f(\text{TG\_Pattern}) = TGPL_{max} * 5/(TGPL_{max} * 5 - T_{unstable}/3),$$
TGPL in frame (10 ms) unit, $T_{unusable}$ in slot unit.

Where $T_{pre}$ can be set as the number of HSDPA usable TTIs between the current gap and the last gap. If there is just one TG-Pattern for a UE in CPM, $T_{unusable}$ can be set the sum of the unusable TTIs within one pattern of the TG-Pattern sequence and $TGPL_{max}$ is the TGPL of this TG-Pattern. If there are multiple TG-Patterns time multiplexed for a UE in CPM, $TGPL_{max}$ is the largest TGPL of these TG-Patterns and $T_{unusable}$ can be set as the sum of the unusable TTIs from all of these TG-Patterns within one pattern of the TG-Pattern sequence with the largest TGPL.

Below some non-limiting examples illustrate how the scheduling coefficients as described above can be used when determining the scheduling priority.

For a proportional scheduler, scheduling priority=$f$(average_rate)*$f$(CQI)*$f$(retrans)
*$f$(TG_Pattern)

where f(average-rate) is the scheduling coefficient of average rate, f(CQI) is the scheduling coefficient of CQI and f(retrans) is the scheduling coefficient of retransmission.

For a delay scheduler, scheduling priority=$f$(maximum_delay)*$f$(CQI)*$f$(retrans)*$f$(TG_Pattern)

where f(maximum_delay) is the scheduling coefficient of maximum delay. Also for all schedulers adapted to determine the scheduling priority based on many different scheduling coefficients different scheduling coefficients may be given different weights when determining the scheduling priority. Hence, in the case when the scheduler has access to many parameters representing a number of different scheduling coefficients, the scheduling priority can be determined as a function of all or some of those parameters depending on the environment in which the scheduler is deployed.

From a feasibility perspective, since the Node B and the UE are triggered usually 1~2 s before they enter the CPM simultaneously, there is enough time for the Node B to configure the scheduler in advance.

Figure 5A:
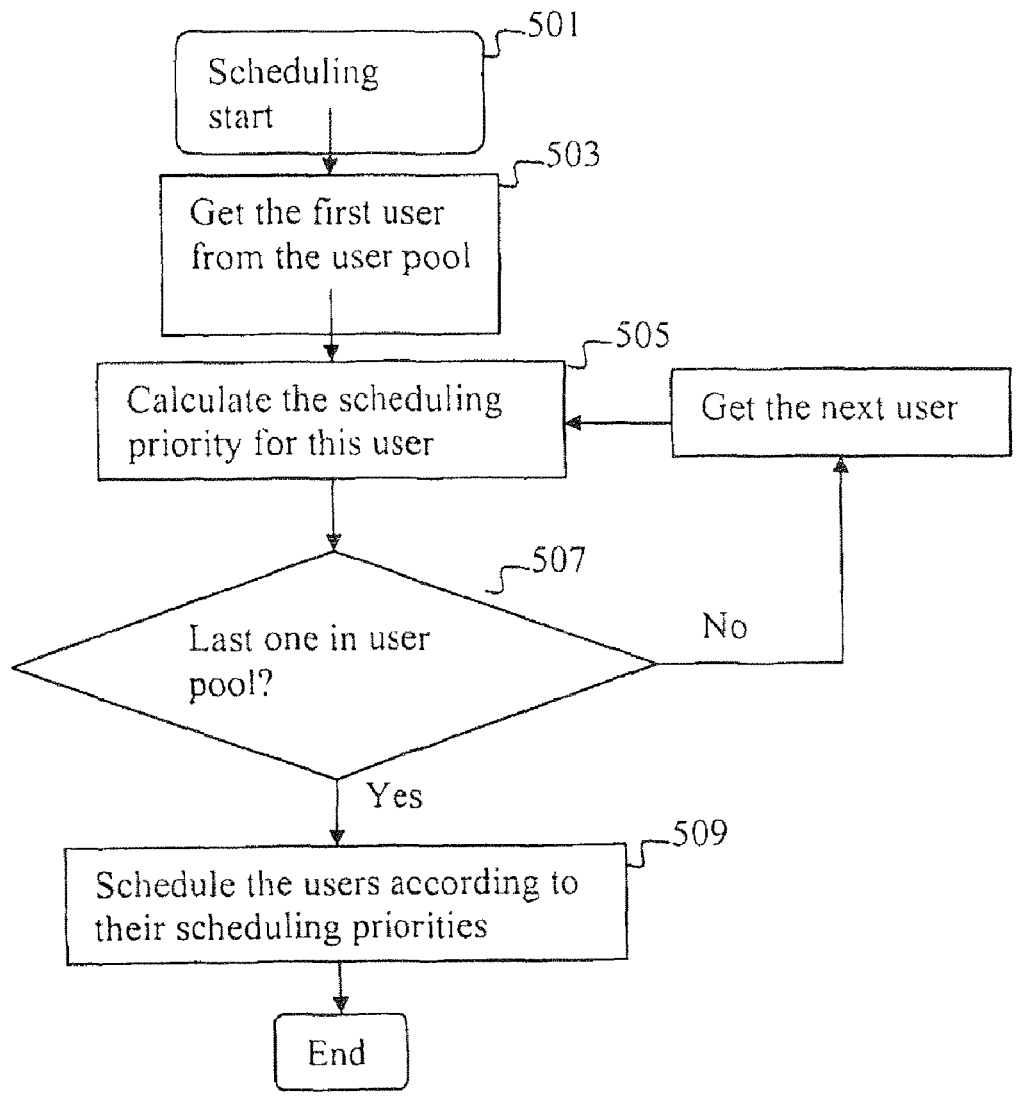
FIGS. 5a-5c are flowcharts illustrating different steps performed in a scheduler adapted to consider unusable TTIs
Figure 5B:
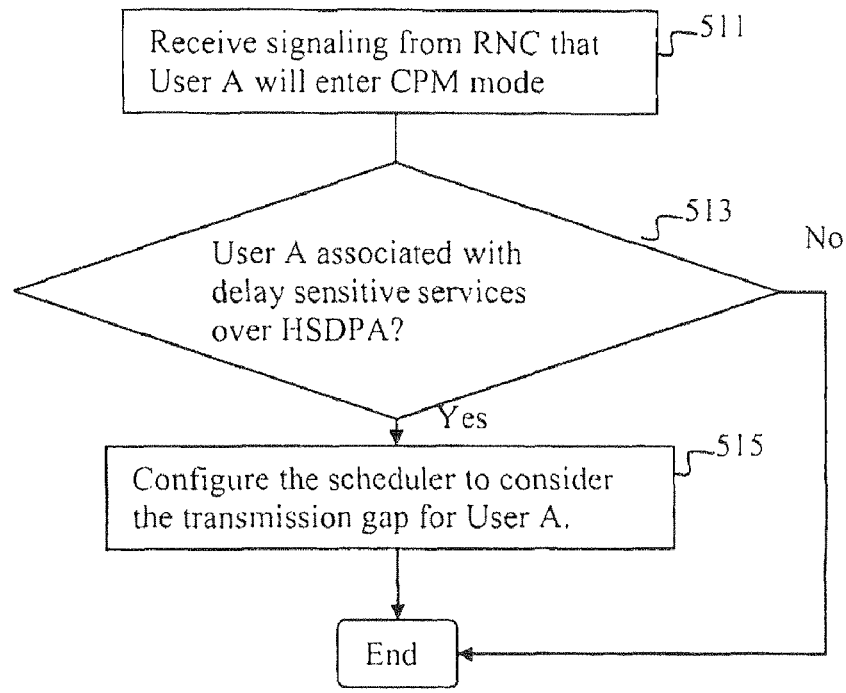
Figure 5C:
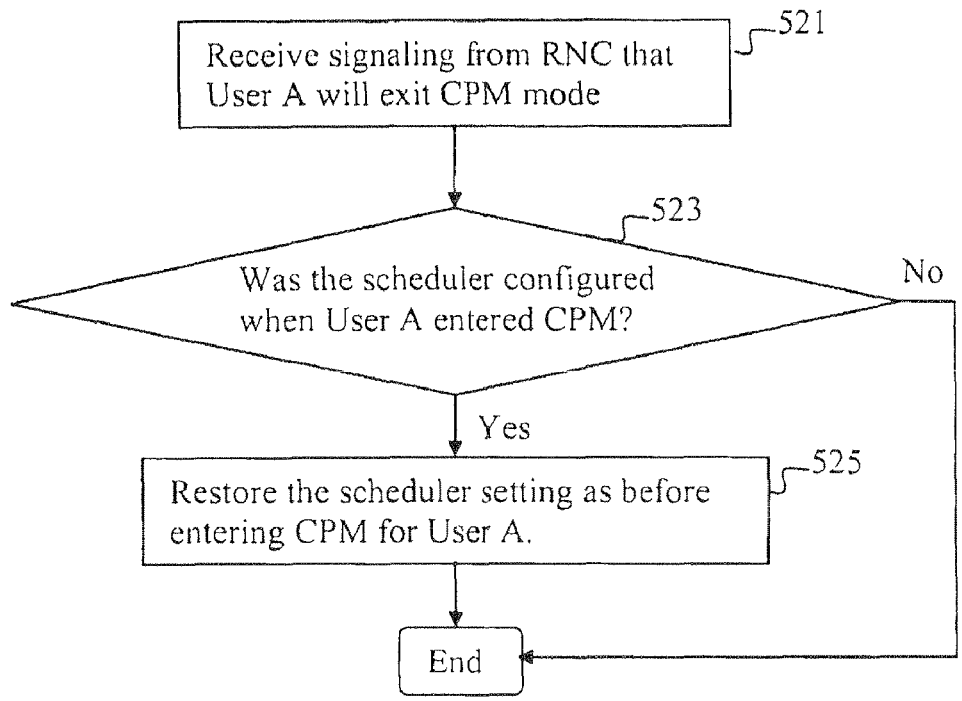

In FIGS. 5a-5c, different steps performed in a scheduler operating in accordance with the principles set out above are described in more detail.

In FIG. 5a, a flow chart illustrating steps performed in a scheduler, for example a MAC-hs, scheduler adapted to operate in accordance with the scheduling methods as described herein is shown. First the scheduling starts in a step 501. Next the scheduler obtains information about a first user in a user pool, step 503. Thereupon the scheduling priority for that particular user is calculated in a step 505. The calculations performed in step 505 can for example be any of the calculations described above for obtaining a scheduling priority. For all users in the pool the steps 503 and 505 are then repeated as indicated by step 507. When all users have been assigned a scheduling priority, the scheduler then schedules the users in accordance with their determined priorities, step 509.

In FIG. 5b, a flow chart illustrating some other steps performed in a scheduler, for example a MAC-hs scheduler, adapted to operate in accordance with the scheduling methods as described herein is shown. Thus, the scheduler 307 can at any time receive a signal From the RNC 305 that a particular UE 303 will enter CPM as indicated by step 511. Upon reception of such a signal for a particular UE the scheduler will check if that particular UE is associated with delay sensitive set-vices provided by HSDPA, step 513. If the particular UE is associated with delay sensitive services provided by HSDPA, the scheduler will be reconfigured, for example by updating the scheduler priority calculation algorithm for that particular UE, to reflect the changed mode of the UE, step 515. If the particular UE is not associated with delay sensitive services provided by HSDPA no action is taken in response to the signal received in step 511.

In FIG. 5c, a flow chart illustrating yet some other steps performed in a scheduler, for example a MAC-hs scheduler, adapted to operate in accordance with the scheduling methods as described herein is shown. Thus, the scheduler 307 can at any time receive a signal from the RNC 305 that a particular UE 303 will exit CPM as indicated by step 521. Upon reception of such an exit CPM signal for a particular UE the scheduler will check if that particular UE was reconfigured when entering CPM, step 523. If the particular UE was reconfigured the scheduler will restore, for example by updating the scheduler priority calculation algorithm for that particular UE, the UE to reflect the changed mode of the UE, step 525. If the particular UE was not reconfigured upon entry into CPM, no action is taken in response to the signal received in step 521. Of course other events may also trigger the scheduler to update the scheduler priority algorithm applied to a particular user, the above description serving as an example only.

Using the method and system as described herein will result in a significantly reduced packet delay and packet loss rate for users operating in a system environment having supporting different technologies, such as for example HSDPA users in a CPM supported radio network system. The method is easy to be implemented in products and has a low algorithm complexity. Furthermore there will be no impact on hardware and very small impact on software.

The invention claimed is:

1. A method of scheduling data transmissions in a radio network system, the radio network system including a plurality of users forming a user group, the method comprising:

for each user in the user group, determining a data transmission scheduling priority, the data transmission scheduling priority dependent on one or more data transmission scheduling coefficients representing: unusable data transmission time, maximum packet delay, average rate, data retransmission rate, or channel quality indicator (CQI) for each user, and scheduling data transmissions of each user in accordance with the determined data transmission scheduling priority.

2. The method according to claim 1, further comprising re-determining the data transmission scheduling priority for a user in response to a changed mode for said user.

3. The method according to claim 1, wherein the radio network system is a wideband code division multiple access (WCDMA) network supporting high-speed downlink packet access (HSPDA) and compressed mode (CPM).

4. The method according to claim 3, further comprising an additional data transmission scheduling coefficient corresponding to a transmission gap (TG) pattern for a user in CPM.

5. The method according to claim 4, wherein the maximum packet delay scheduling coefficient includes, prior to a transmission gap, during a pre-determined time period, unusable data transmission time intervals (TTIs) set as the delay (maximum_delay), according to:

$$f(\text{maximum\_delay}) = 1/(T_{MAX} - (t_{queue} + T_{unusable}))$$

where $t_{queue}$ is the time corresponding to the time a data transmission packet has already been queued and $T_{MAX}$ is a maximum allowable queuing delay.

6. The method according to claim 4, further comprising an additional data transmission scheduling coefficient corresponding to proportional fair scheduling and including, prior to a transmission gap, during a pre-determined time period, unusable data transmission time intervals (TTIs) set as the used time ($t_{used}$), according to:

$$f(\text{average\_rate}) = \left(\frac{N_b}{t_{used} + T_{unusable}}\right)^{-1}$$

where $t_{used}$ is a certain period before a data transmission scheduling priority calculation and $N_b$ is a number of transmitted bits during $t_{used}$.

7. A method according to claim 1, further comprising, when more than one data transmission scheduling coefficient is used to determine the data transmission scheduling priority, the data transmission scheduling priority is determined as a function of all used data transmission scheduling coefficients.

8. A scheduler to schedule data transmissions in a radio network system, the radio network system including a plurality of users forming a user group, the scheduler configured to:

for each user in the user group, determine a data transmission scheduling priority, the data transmission scheduling priority dependent on one or more data transmission scheduling coefficients representing: unusable data transmission time, maximum packet delay, average rate, data retransmission rate, and channel quality indicator (CQI) for each user, and schedule data transmissions of each user in accordance with the determined data transmission scheduling priority.

9. The scheduler according to claim 8, further configured to re-determine the data transmission scheduling priority for a user in response to a changed mode for said user.

10. The scheduler according to claim 8, wherein the radio network system is a wideband code division multiple access (WCDMA) network supporting high-speed downlink packet access (HSPDA) and compressed mode (CPM).

11. The scheduler according to claim 10, further configured with an additional data transmission scheduling coefficient corresponding to a transmission gap (TG) pattern for a user in CPM.

12. The scheduler according to claim 11, wherein the maximum packet delay scheduling coefficient includes, prior to a transmission gap, during a pre-determined time period, unusable data transmission time intervals (TTIs) set as the delay (maximum_delay), according to:

$$f(\text{maximum\_delay}) = 1/(T_{MAX} - (t_{queue} + T_{unusable}))$$

where $t_{queue}$ is the time corresponding to the time a data transmission packet has already been queued and $T_{MAX}$ is a maximum allowable queuing delay.

13. The scheduler according to claim 11, further configured with an additional data transmission scheduling coefficient corresponding to proportional fair scheduling and including, prior to a transmission gap, during a pre-determined time period, unusable data transmission time intervals (TTIs) set as the used time ($t_{used}$), according to:

$$f(\text{average\_rate}) = \left(\frac{N_b}{t_{used} + T_{unusable}}\right)^{-1}$$

where $t_{used}$ is a certain period before a data transmission scheduling priority calculation and $N_b$ is a number of transmitted bits during $t_{used}$.

14. The scheduler according to claim 8, further configured, when more than one data transmission scheduling coefficient is used to determine the data transmission scheduling priority, to schedule priority as a function of all used data transmission scheduling coefficients.

* * * * *

UNITED STATES PATENT AND TRADEMARK OFFICE
CERTIFICATE OF CORRECTION

| | | |
|---|---|---|
| PATENT NO. | : 8,179,853 B2 | Page 1 of 1 |
| APPLICATION NO. | : 12/445631 | |
| DATED | : May 15, 2012 | |
| INVENTOR(S) | : Hu et al. | |

It is certified that error appears in the above-identified patent and that said Letters Patent is hereby corrected as shown below:

On the Face Page, in Field (54), and Column 1, Lines 1-2, in Title
delete "METHOD OF SCHEDULING DATA TRANSMISSION IN A RADIO NETWORK" and
insert -- SCHEDULING DATA TRANSMISSIONS IN A RADIO NETWORK --, therefor.

In Column 1, Line 30, delete "connected." and insert -- connected, --, therefor.

In Column 1, Line 45, delete "(IISDPA)" and insert -- (HSDPA) --, therefor.

In Column 1, Line 45, delete "MSDPA" and insert -- HSDPA --, therefor.

In Column 1, Line 48, delete "(HS-DSCl-1)" and insert -- (HS-DSCH) --, therefor.

In Column 1, Line 51, delete "1-1s-DSCI 1" and insert -- HS-DSCH --, therefor.

In Column 3, Line 13, delete "HS-SCCM" and insert -- HS-SCCH --, therefor.

In Column 4, Line 12, delete "NSDPA" and insert -- HSDPA --, therefor.

In Column 5, Line 30, delete "5-$T_{unstable}$/3)," and insert -- 5-$T_{unusable}$/3), --, therefor.

In Column 5, Line 51, delete "f(average-rate)" and insert -- f(average_rate) --, therefor.

In Column 7, Line 49, in Claim 7, delete "A" and insert -- The --, therefor.

Signed and Sealed this
Thirteenth Day of November, 2012

David J. Kappos
*Director of the United States Patent and Trademark Office*